(12) United States Patent
Kim et al.

(10) Patent No.: US 7,396,618 B2
(45) Date of Patent: Jul. 8, 2008

(54) COLOR FILTER SUBSTRATE FOR LIQUID CRYSTAL DISPLAY DEVICE AND METHOD OF FABRICATING THE SAME

(75) Inventors: Jeong-Hyun Kim, Gunpo-si (KR); Sam-Yeoul Kim, Osan-si (KR)

(73) Assignee: LG. Display Co., Ltd, Seoul (KR)

( * ) Notice: Subject to any disclaimer, the term of this patent is extended or adjusted under 35 U.S.C. 154(b) by 343 days.

(21) Appl. No.: 11/284,385

(22) Filed: Nov. 18, 2005

(65) Prior Publication Data
US 2006/0121370 A1 Jun. 8, 2006

(30) Foreign Application Priority Data
Dec. 3, 2004 (KR) .................. 10-2004-0100817
Dec. 9, 2004 (KR) .................. 10-2004-0103428

(51) Int. Cl.
*G02B 5/20* (2006.01)
*G02F 1/1335* (2006.01)
(52) U.S. Cl. ................. 430/7; 430/200; 347/107
(58) Field of Classification Search .......... None
See application file for complete search history.

(56) References Cited

U.S. PATENT DOCUMENTS

| 6,242,140 B1 | 6/2001 | Kwon et al. |
| 2003/0021000 A1* | 1/2003 | Takizawa et al. ............ 359/263 |
| 2003/0082465 A1* | 5/2003 | Takizawa ...................... 430/7 |

FOREIGN PATENT DOCUMENTS

| JP | 7-181316 A * | 7/1995 |
| JP | 09-113890 | 5/1997 |
| JP | 11-174223 | 7/1999 |
| KR | 1998-084577 | 12/1998 |

* cited by examiner

*Primary Examiner*—John A. McPherson
(74) *Attorney, Agent, or Firm*—Brinks Hofer Gilson & Lione

(57) ABSTRACT

A color filter substrate for a liquid crystal display device includes a substrate having first, second and third sub-pixel regions and first, second and third border regions between adjacent sub-pixel regions, first red, first green and first blue color filter patterns at the first, second and third sub-pixel regions, respectively, and second red, second green and second blue color filter patterns at each of the first, second and third border regions.

30 Claims, 13 Drawing Sheets

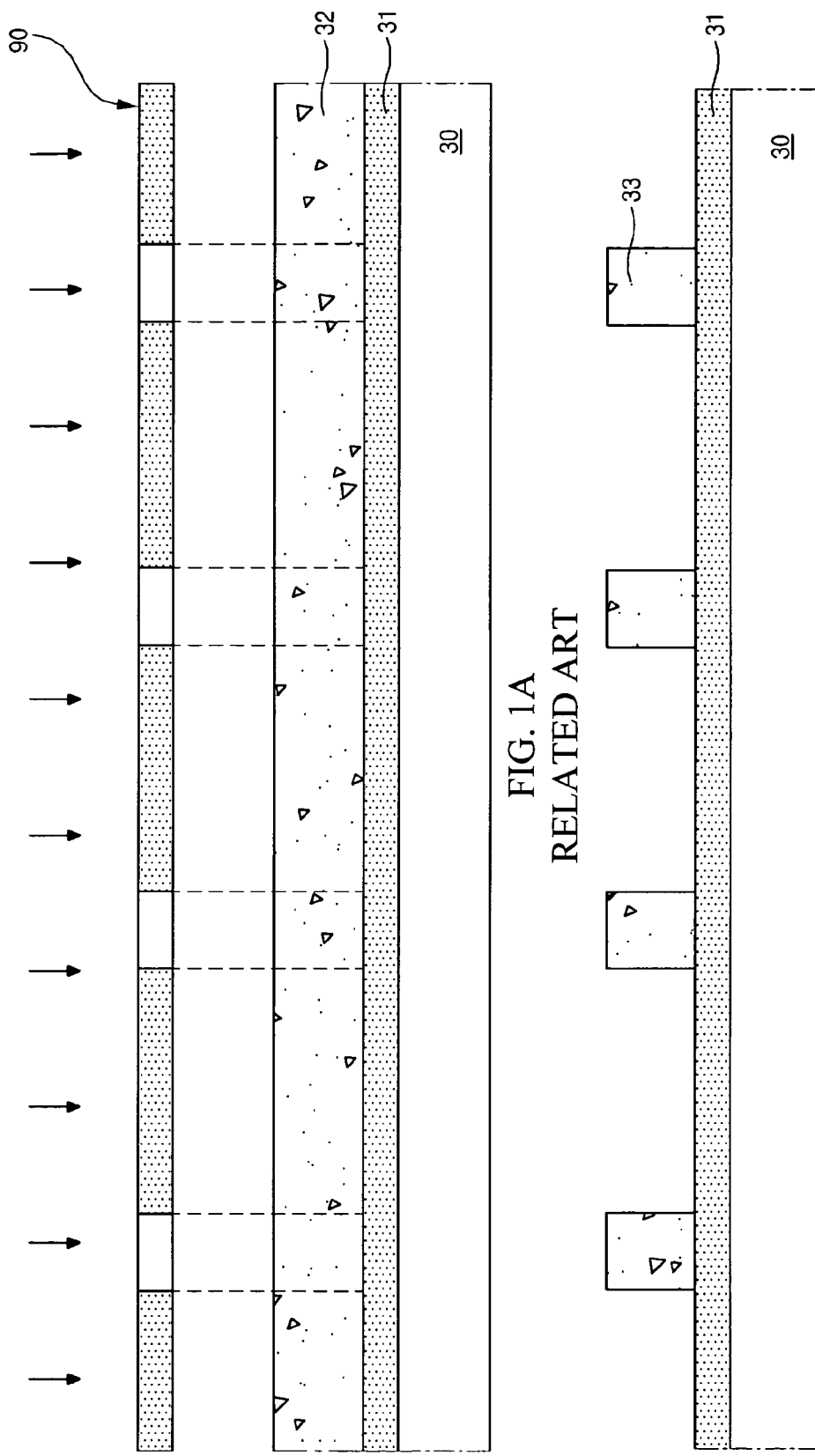

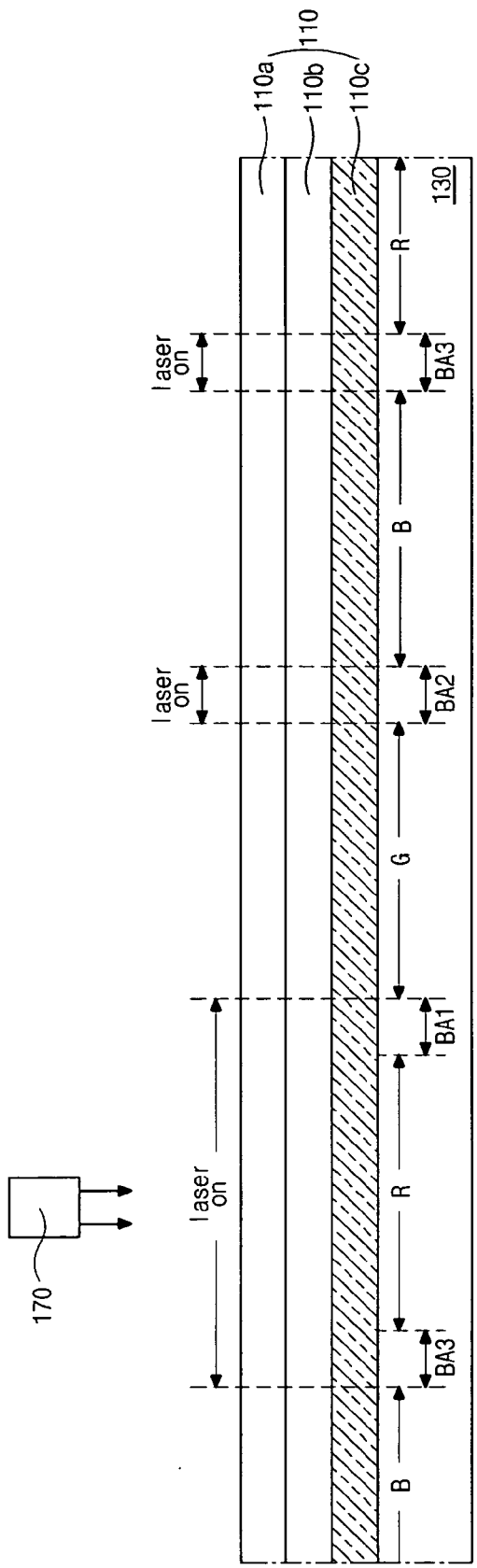
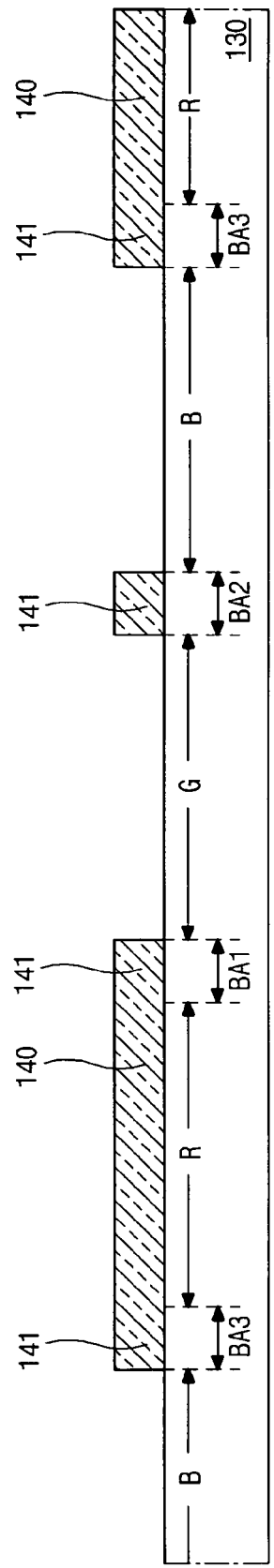
FIG. 2B
FIG. 2C

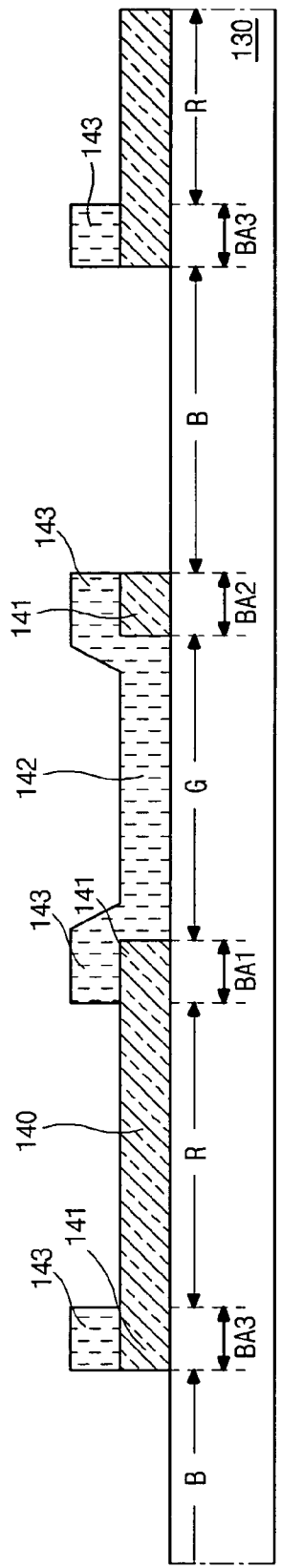
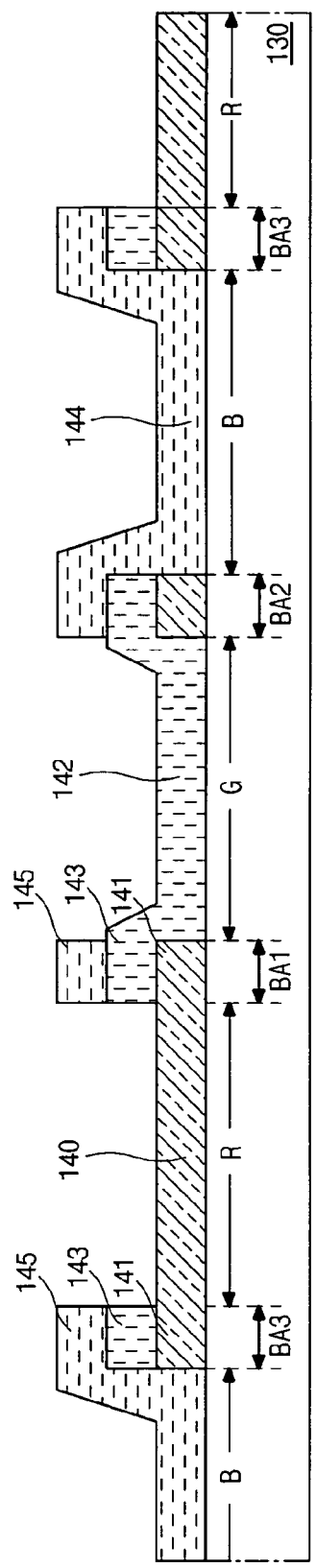
FIG. 2F
FIG. 2G

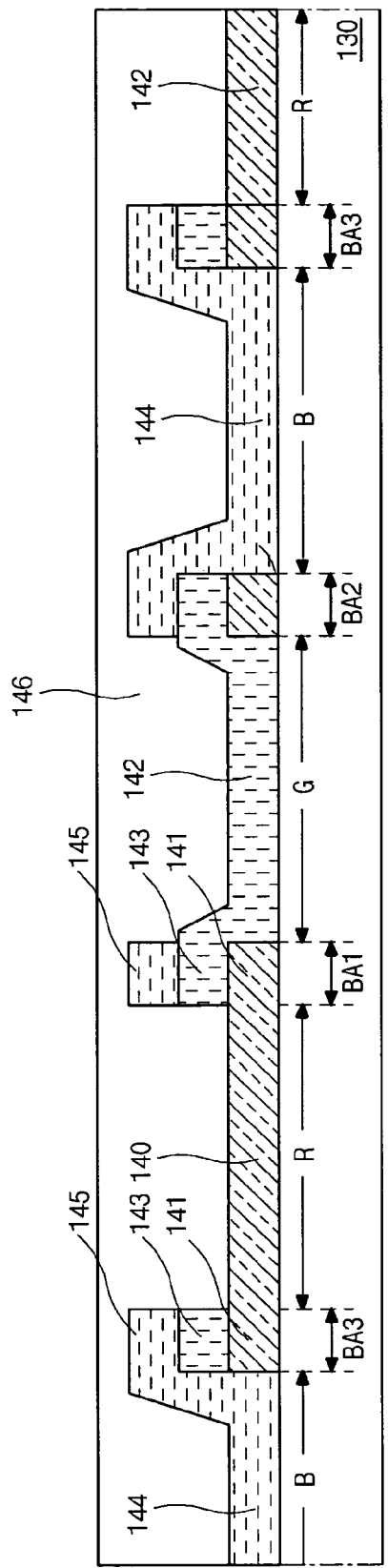
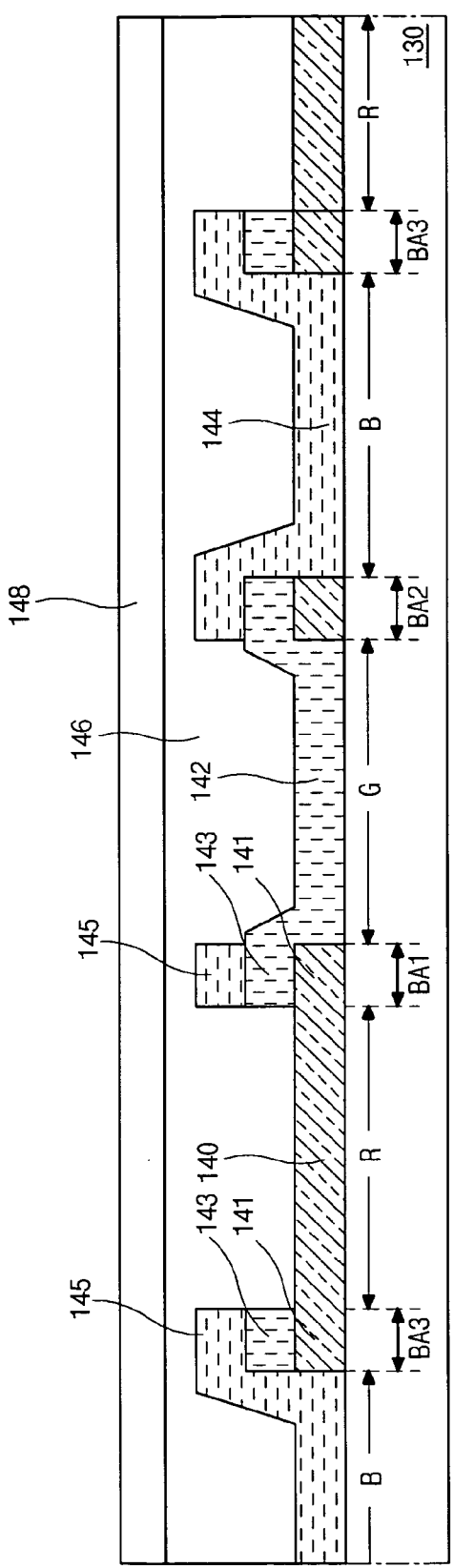
FIG. 2H
FIG. 2I

COLOR FILTER SUBSTRATE FOR LIQUID CRYSTAL DISPLAY DEVICE AND METHOD OF FABRICATING THE SAME

This application claims the benefit of priority under 35 U.S.C. § 119 to Korean Patent Application No. 2004-0100817, filed on Dec. 3, 2004 and to Korean Patent Application No. 2004-0103428, filed on Dec. 9, 2004.

FIELD OF THE INVENTION

The present invention relates to a liquid crystal display device, and more particularly, to a color filter substrate for a liquid crystal display device and a method of fabricating the same.

DISCUSSION OF THE RELATED ART

Due to rapid development in information technology, display devices are evolving to process and display increasingly larger amounts of information. Flat panel display technologies have been recently developed, resulting in thin, lightweight, low power consuming display devices. Among these devices, the liquid crystal display (LCD) device is already widely used in notebook computers and desktop monitors because of its superior resolution, image quality, and color image display.

Typically, an LCD device includes an upper substrate, a lower substrate, and a liquid crystal layer interposed between the upper and lower substrates. The LCD device uses an optical anisotropy of a liquid crystal material and produces an image by varying the transmittance of light according to the arrangement of liquid crystal molecules by an electric field.

The lower substrate, which is usually referred to as an array substrate, includes thin film transistors and pixel electrodes. The lower substrate is fabricated through repeated photolithography processes to pattern a previously formed thin film. The upper substrate, which is usually referred to as a color filter substrate, includes a color filter layer for displaying color images. The color filter layer commonly includes color filter patterns of red (R), green (G), and blue (B). Various methods may be used to form the color filter layer including, dyeing, electro-deposition, pigment dispersion, and printing. In general, the pigment dispersion method is more commonly used, because it forms a fine pattern with good reproducibility.

However, fabricating the color filter substrate is complicated in terms of time and equipment, because the fabrication requires repeated coating, exposing, developing, and curing of the color resist. To address the fabrication problem, a thermal imaging methodology has been used to form a color filter layer on a color filter substrate. The color filter layer is formed on the substrate by adhering a color filter transcription film to a substrate and exposing the film to a light source, such as a laser beam, so that the color filter layer of the color filter transcription film is transferred to the substrate.

The color filter transcription film includes a supporting film, a light-to-heat conversion (LTHC) layer, and a color filter layer. The supporting film supports the LTHC layer and the color filter layer and transmits the laser beam toward the LTHC layer. The supporting film may be formed from a transparent polymeric material, such as polyester or polyethylene. The LTHC layer transforms light absorbed from the laser beam into thermal energy. Accordingly, the LTHC may be formed from a material with an ability to convert light into heat. The color filter layer may be formed from materials containing red, green or blue pigments.

FIGS. 1A to 1I show a method of fabricating a color filter substrate using thermal imaging according to a related art. As shown in FIG. 1A, a metal material, such as chromium or chromium oxide (CrOx), is deposited on a transparent substrate 30 to form a black matrix layer 31 thereon. A photoresist resin is then coated on substantially the entire surface of the black matrix layer 31 to form a photoresist layer 32. A mask 90, including a light-blocking portion and a light-transmitting portion, is disposed over the photoresist layer 32, and the photoresist layer 32 is exposed to light through the mask 90. The exposed photoresist layer 32 of FIG. 1A is developed, thereby forming the photoresist pattern 33 depicted in FIG. 1B. The resultant photoresist layer 32 depicted in FIG. 1B is a negative type pattern in which portions exposed to light remain after developing. However, a positive type pattern may be formed in which the portions exposed to light are removed after developing.

Next, the black matrix layer 31 of FIG. 1B is selectively removed according to the photoresist pattern 33 resulting in a black matrix 35 having openings (FIG. 1C). The photoresist pattern 33 of FIG. 1C on the black matrix 35 is then removed by a stripping or ashing process (FIG. 1D).

As shown in FIG. 1E, a first color filter transcription film 10, including a supporting film 10a, a light-to-heat conversion (LTHC) layer 10b, and a color filter layer 10c is disposed over the substrate 30 and the black matrix 35, such that the color filter layer 10c faces the substrate 30 on which the black matrix 35 is formed. Then, the color filter layer 10c of the first color filter transcription film 10 is adhered to the substrate 30.

Next, the substrate 30, including the adhered first color filter transcription film 10, is loaded in a laser apparatus, and a laser head 50, from which a laser beam is generated, is disposed over the first color filter transcription film 10 (FIG. 1F). The substrate 30 may be located on a stage (not shown). The laser beam is applied to the first color filter transcription film 10 at a portion A where a first color filter pattern will be formed when the laser head 50 or stage is reciprocated in a straight line. In the portions of the first color filter transcription film 10 exposed to the laser beam, the LTHC layer 10b transforms light absorbed from the laser beam into thermal energy, thereby emitting thermal energy toward the color filter layer 10c so that the color filter layer 10c is transferred onto the substrate 30. A first color filter pattern 40 is formed in the opening of the black matrix 35 corresponding to portion A following removal of the first color filter transcription film 10 of FIG. 1F. The first color filter pattern 40 partially covers adjacent portions of the black matrix 35. As shown in FIG. 1H, a second color filter pattern 42 and third color filter pattern 44 may be similarly formed on the substrate 30 using a second and third color filter transcription film according to the process depicted in FIGS. 1E to 1G.

The substrate 30 with the color filter patterns 40, 42 and 44 according to FIG. 1H is placed in a hardening furnace, such as an oven, at about 200 to 300 degrees Celsius and the color filter patterns 40, 42 and 44 are hardened. An overcoat layer 46 is then formed on the hardened color filter patterns 40, 42 and 44 as shown in FIG. 1I. The overcoat layer 46 protects the color filter patterns 40, 42 and 44 and flattens the surface of the substrate 30. A common electrode 48 is formed on the overcoat layer 46 by depositing a transparent conductive material, such as indium tin oxide and/or indium zinc oxide.

In the thermal imaging method for fabricating color filter substrates according to the related art, the black matrix 35 between adjacent color filter patterns 40, 42 and 44 separates colors of the color filter patterns 40, 42 and 44. In addition, the black matrix 35 blocks light from liquid crystal molecules that are irregularly driven over gate and data lines of an array substrate. The black matrix 35 is commonly formed from metal material having an optical density greater than 4, such as chromium. Forming the black matrix requires a complicated photolithographic process, including the steps of coating, exposing, and developing a photoresist, and etching following deposition of the black matrix material. The apparatuses used to carry out these processes present significant manufacturing costs. Accordingly, there is a need to simplify and reduce manufacturing costs for fabricating color filter substrates.

SUMMARY OF THE INVENTION

In one aspect, the present invention provides a color filter substrate for a liquid crystal display device, the substrate including first, second and third sub-pixel regions and first, second and third border regions between adjacent sub-pixel regions; first red, first green and first blue color filter patterns at the first, second and third sub-pixel regions, respectively; and second red, second green and second blue color filter patterns at each of the first, second and third border regions.

In another aspect, the present invention provides a method of fabricating a color filter substrate for a liquid crystal display device, the method including providing a substrate including first, second and third sub-pixel regions and first, second and third border regions between adjacent sub-pixel regions; forming a first red color filter pattern at the first sub-pixel region and a second red color filter pattern at each of the first, second and third border regions; forming a first green color filter pattern at the second sub-pixel region and a second green color filter pattern at each of the first, second and third border regions; and forming a first blue color filter pattern at the third sub-pixel region and a second blue color filter pattern at each of the first, second and third border regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings illustrate aspects and principles of the related art and of the present invention:

FIGS. 1A to 1I are cross-sectional views illustrating a method of fabricating a color filter substrate using thermal imaging according to the related art;

FIGS. 2A to 2I are cross-sectional views illustrating a method of fabricating a color filter substrate using thermal imaging according to a first embodiment of the present invention.

DETAILED DESCRIPTION OF THE ILLUSTRATED EMBODIMENTS

Reference will now be made in detail to embodiments of the present invention, examples of which are described in the specification and claims and illustrated in FIGS. 2 and 3.

Figure 1C:
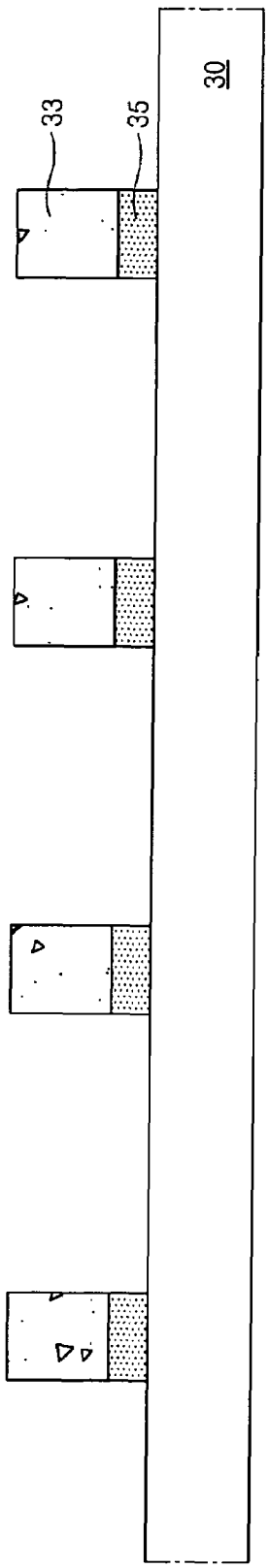
Figure 1D:
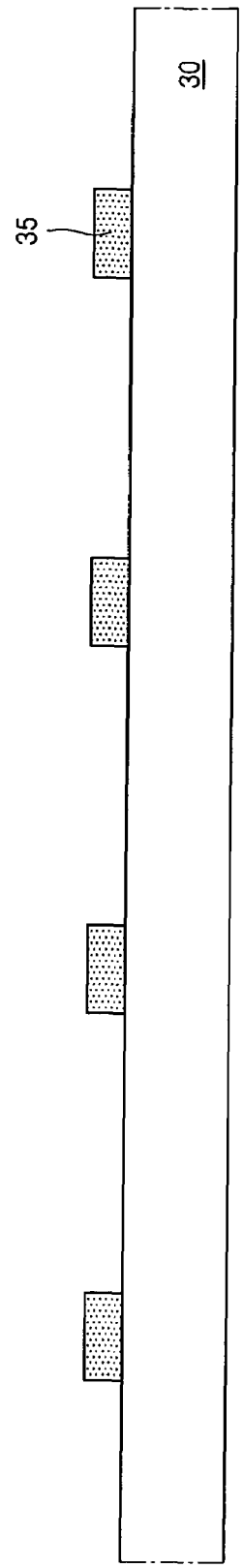
Figures 1E, 1F:
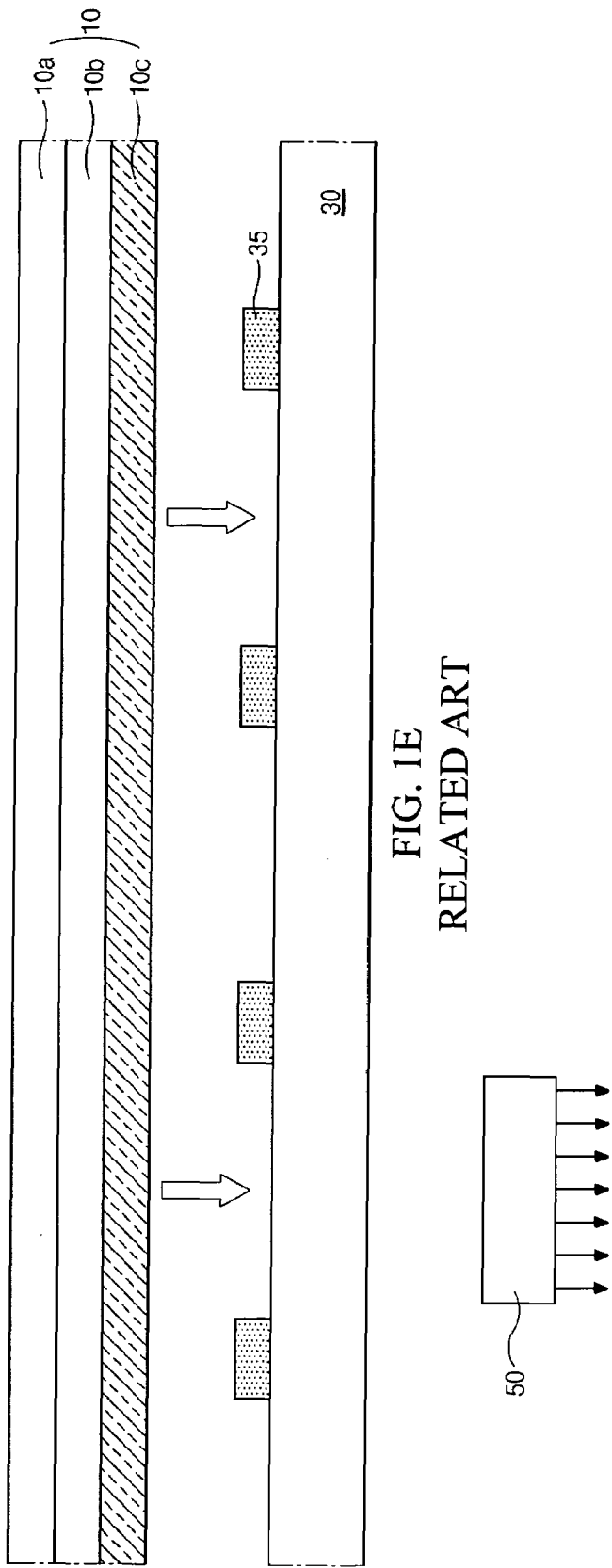
Figure 1G:
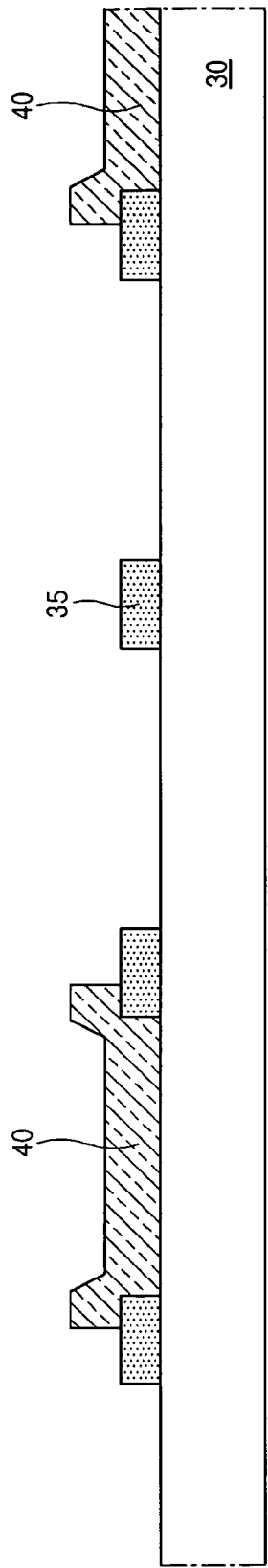
Figure 1H:
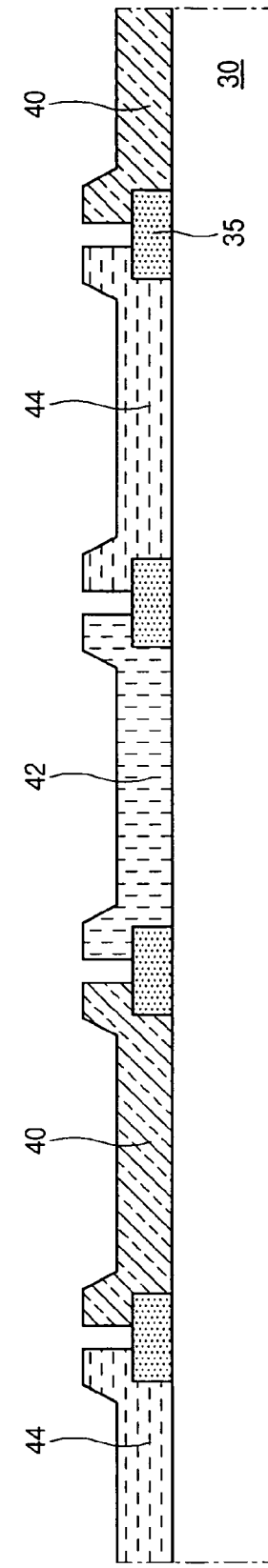
Figure 1I:
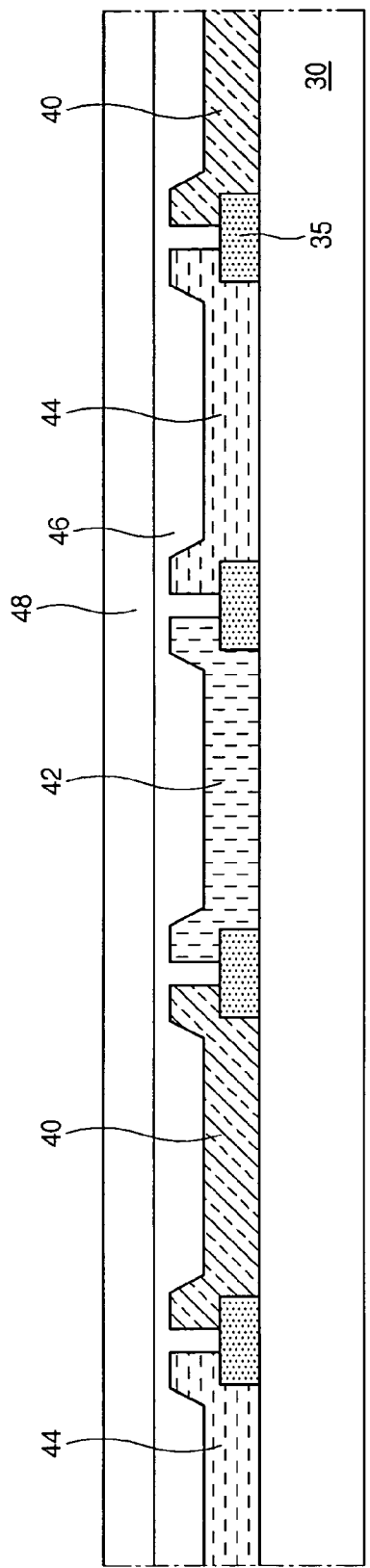
Figure 2A:
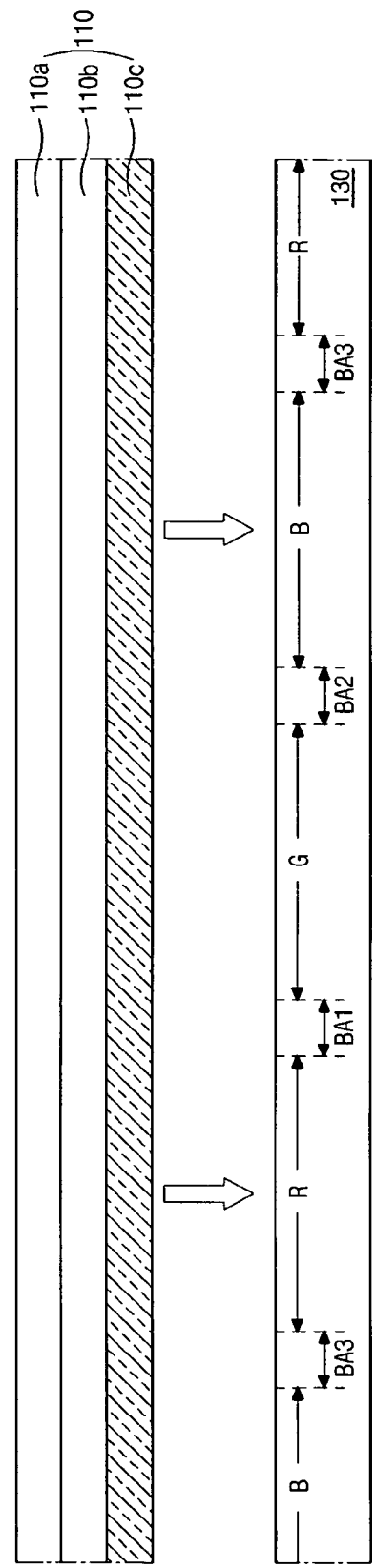

FIGS. 2A to 2I are cross-sectional views illustrating a representative method for fabricating a color filter substrate using thermal imaging according to one aspect of the present invention. As shown in FIG. 2A, first, second and third sub-pixel regions R, G and B and first, second and third border regions BA1, BA2 and BA3 are defined on a transparent substrate 130, and a red color filter transcription film 110 is disposed over the substrate 130. The first, second and third border regions BA1, BA2 and BA3 are sequentially disposed between adjacent sub-pixel regions R, G and B. The red color filter transcription film 110 includes a supporting film 110a, a light-to-heat conversion (LTHC) layer 110b and a red color filter layer 110c. The red color filter layer 110c of the red color filter transcription film 110 is adhered to the substrate 130 without bubbles using a transcription apparatus having a transcription roll.

As shown in FIG. 2B, a laser 170 is disposed at a distance over the red color filter transcription film 110. The laser 170 scans the substrate 130 and applies a laser beam to the red color filter transcription film 110 at portions corresponding to the first sub-pixel region R and at portions corresponding to the first, second and third border regions BA1, BA2 and BA3. In the portions of the red color filter transcription film 110 exposed to the laser beam, the LTHC layer 110b transforms light absorbed from the laser beam into thermal energy, thereby emitting thermal energy toward the red color filter layer 110c. As a result of the emitted thermal energy, the red color filter layer 110c detaches from the LTHC layer 110b and becomes fixed on the substrate 130. Accordingly, the red color filter transcription film 110 of FIG. 2B is removed from the substrate 130, a first red color filter pattern 140 is formed in the first sub-pixel region R and a second red color filter pattern 141 is formed in each of the first, second and third border regions BA1, BA2 and BA3 (FIG. 2C). Because the laser beam is not applied to the LTHC layer 110b of FIG. 2B in the second and third sub-pixel regions G and B, portions of the red color filter layer 110c remain attached to the LTHC layer 110b, which are not fixed on the substrate 130. Accordingly, the red color filter layer 110c in the second and third sub-pixel regions G and B is removed with the LTHC layer 110b.

The substrate 130 with the first and second red color filter patterns 140 and 141 is then placed in a hardening (or curing) furnace such as an oven and the first and second red color filter patterns 140 and 141 are hardened (or cured). Preferably, the hardened first and second red color filter patterns 140 and 141 will have a thickness of about 1 μm to about 2 μm.

Figure 2D:
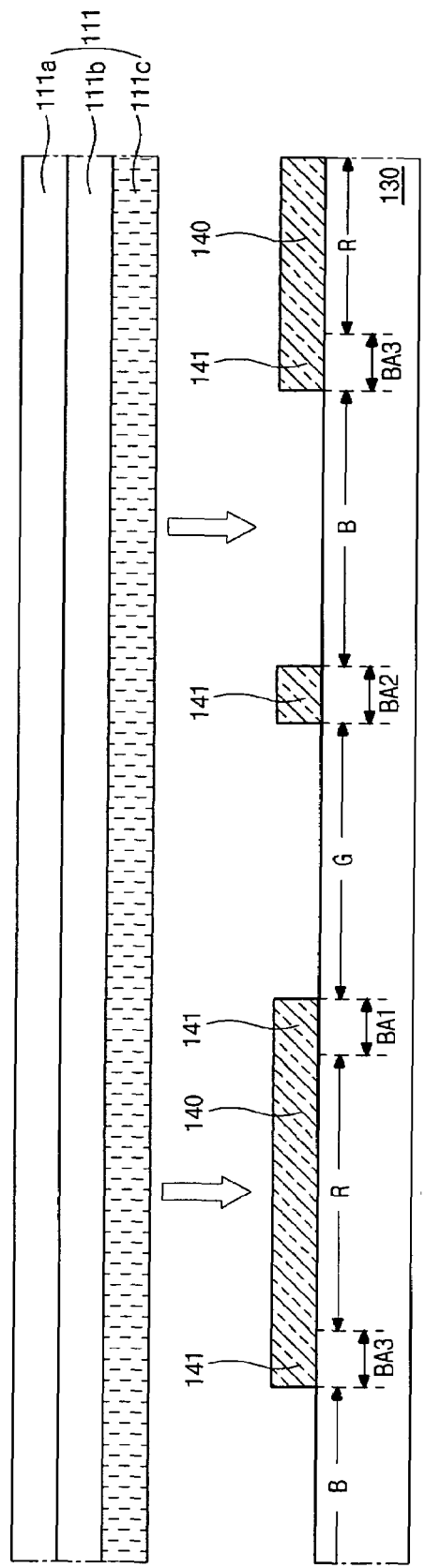

As shown in FIG. 2D, a green color filter transcription film 111 is disposed over the substrate 130 with the first and second red color filter patterns 140 and 141. The green color filter transcription film 111 includes a supporting film 111a, a LTHC layer 111b and a green color filter layer 111c. The green color filter layer 111c of the green color filter transcription film 111 is adhered to the substrate 130 having the first and second red color filter patterns 140 and 141 without bubbles using a transcription apparatus including a transcription roll.

Figure 2E:
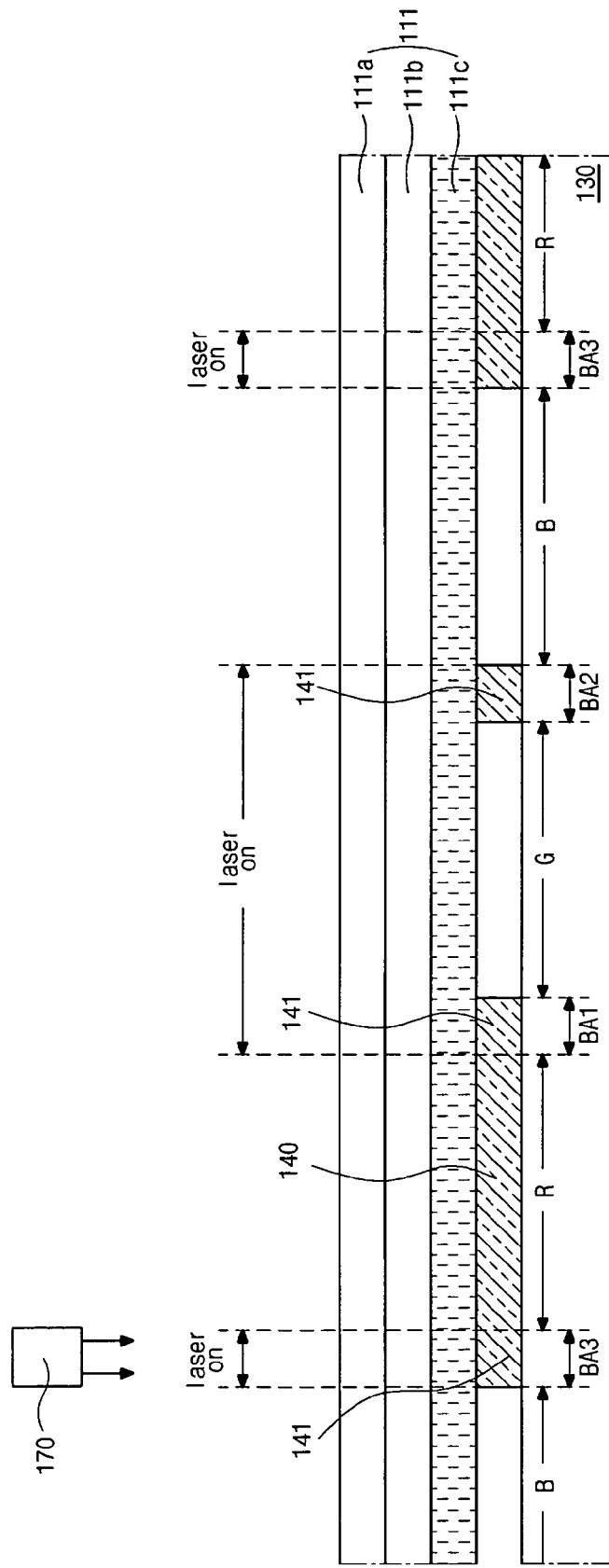

As shown in FIG. 2E, a laser 170, which may be different from the laser in FIG. 2B, is disposed at a distance over the green color filter transcription film 111. The laser 170 scans the substrate and applies a laser beam to the green color filter transcription film 111 at portions corresponding to the second sub-pixel region G and at portions corresponding to the first, second and third border regions BA1, BA2 and BA3.

After the laser scanning, the green color filter transcription film 111 is removed from the substrate 130 (FIG. 2F). In the portions of the green color filter transcription film 111 exposed to the laser beam, the green color filter layer 111c is transferred, such that a first green color filter pattern 142 is formed on the second sub-pixel region G of the substrate 130 and a second green color filter pattern 143 is formed on the second red color filter pattern 141 in each of the first, second and third border regions BA1, BA2 and BA3.

The substrate 130 with the first and second green color filter patterns 142 and 143 is placed in a hardening furnace, such as an oven, and the first and second green color filter patterns 142 and 143 are hardened. Preferably, the hardened first and second green color filter patterns 142 and 143 will have a thickness of about 1 µm to about 2 µm.

Next, a first blue color filter pattern 144 is formed in the third sub-pixel region B and a second blue color filter pattern 145 is formed on the second green color filter pattern 143 in each of the first, second and third border regions BA1, BA2 and BA3 (FIG. 2G). The blue color filter patterns 144 and 145 are formed using a blue color filter transcription film according to the above described process for forming the first and second green color filter patterns 142 and 143 and the first and second red color filter patterns 140 and 141.

Then, the substrate 130 having the first and second blue color filter patterns 144 and 145 is placed in a hardening furnace, such as an oven, and the first and second blue color filter patterns 144 and 145 are hardened. Preferably, the hardened first and second blue color filter patterns 144 and 145 will have a thickness of about 1 µm to about 2 µm.

An overcoat layer 146 is then formed on the substrate 130 with the first red, first green and first blue color filter patterns 140, 142 and 144 in respective sub-pixel regions R, G and B and with the second red, second green and second blue color filter patterns 141, 143 and 145 sequentially formed in each of the first, second and third border regions BA1, BA2 and BA3 (FIG. 2H). The overcoat layer 146 may be formed by coating a transparent organic material, such as photo acryl. The overcoat layer 146 protects the color filter patterns 140, 141, 142, 143, 144 and 145 and flattens a surface of the substrate 130 having the color filter patterns 140, 141, 142, 143, 144 and 145. The overcoat layer 146 has a thickness sufficient to cover the second red, second green and second blue color filter patterns 141, 143 and 145 in each of the first, second and third border regions BA1, BA2 and BA3. The thickness of the overcoat layer 146 may be about 3 µm to about 6 µm.

As shown in FIG. 2I, a common electrode 148 is formed on the substrate 130 including the overcoat layer 146 by depositing a transparent conductive material, such as indium tin oxide.

In the above example, hardening (or curing) processes are performed after each of the respective color filter patterns is formed. However, a hardening process may be additionally performed thereafter. Further, although the red, green and blue color filter patterns are sequentially formed in FIGS. 2B-2G, other forming orders may be employed and other color filter patterns may be formed.

In the above color filter substrate, because the second red, second green and second blue color filter patterns are formed to the same extent in each border region, the second red, second green and second blue color filter patterns in a border region show black. Accordingly, the second red, second green and second blue color filter patterns function as a black matrix blocking light.

To increase color reproducibility, more particularly, purity of red, green and blue colors, the first red, green and blue color filter patterns may have a thickness between about 1 µm and about 2 µm. Color purity increases with the thickness of the color filter pattern. Therefore, the chroma of colors is improved and good colors are produced. The improved color reproducibility is reflected by a larger area on the NTSC (National Television System Committee) chromaticity coordinates.

However, the thicker the color filter layer in the color filter transcription film, the more thermal energy is required to transfer the color filter layer on the substrate. Increased thermal energy can be supplied using a laser having a laser beam with a higher density per unit area, which increases manufacturing costs. Moreover, when thicker color filter layers are used, there is reduced accuracy in forming a fine pattern, which leads to decreased productivity. In view of these problems and considerations, color filter patterns according to the first embodiment have an optimized thickness of about 1 µm to about 2 µm.

In a further aspect of the present invention, a color filter substrate and a method of fabricating the same are provided, which incorporate fine color patterns by using color filter transcription film having a thinner color filter layer than in the above example.

Figure 3A:
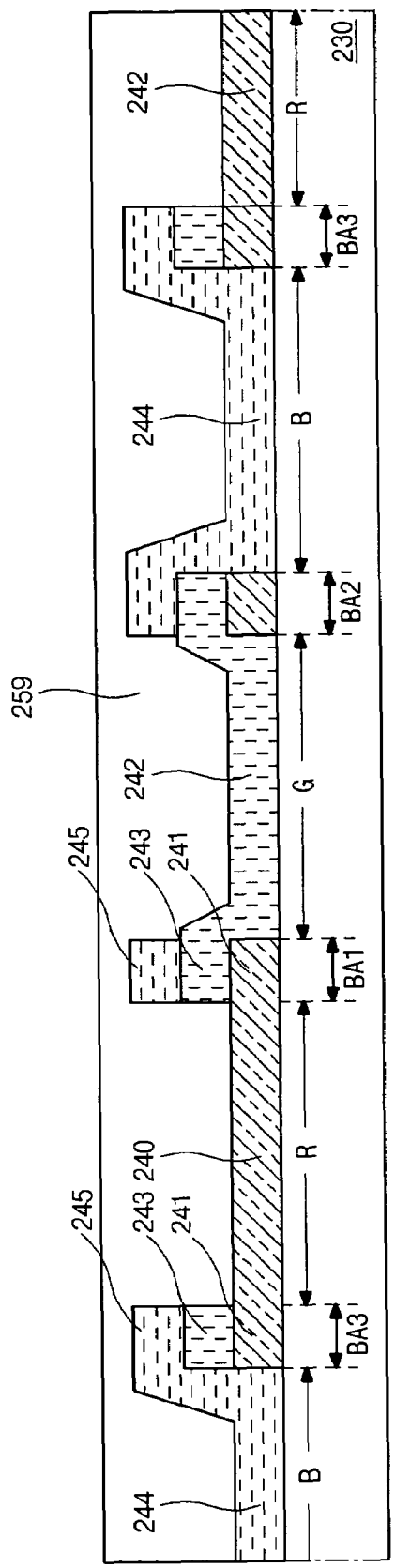
FIGS. 3A to 3C are cross-sectional views illustrating a method of fabricating a color filter substrate according to the second embodiment of the present invention.
Figure 3B:
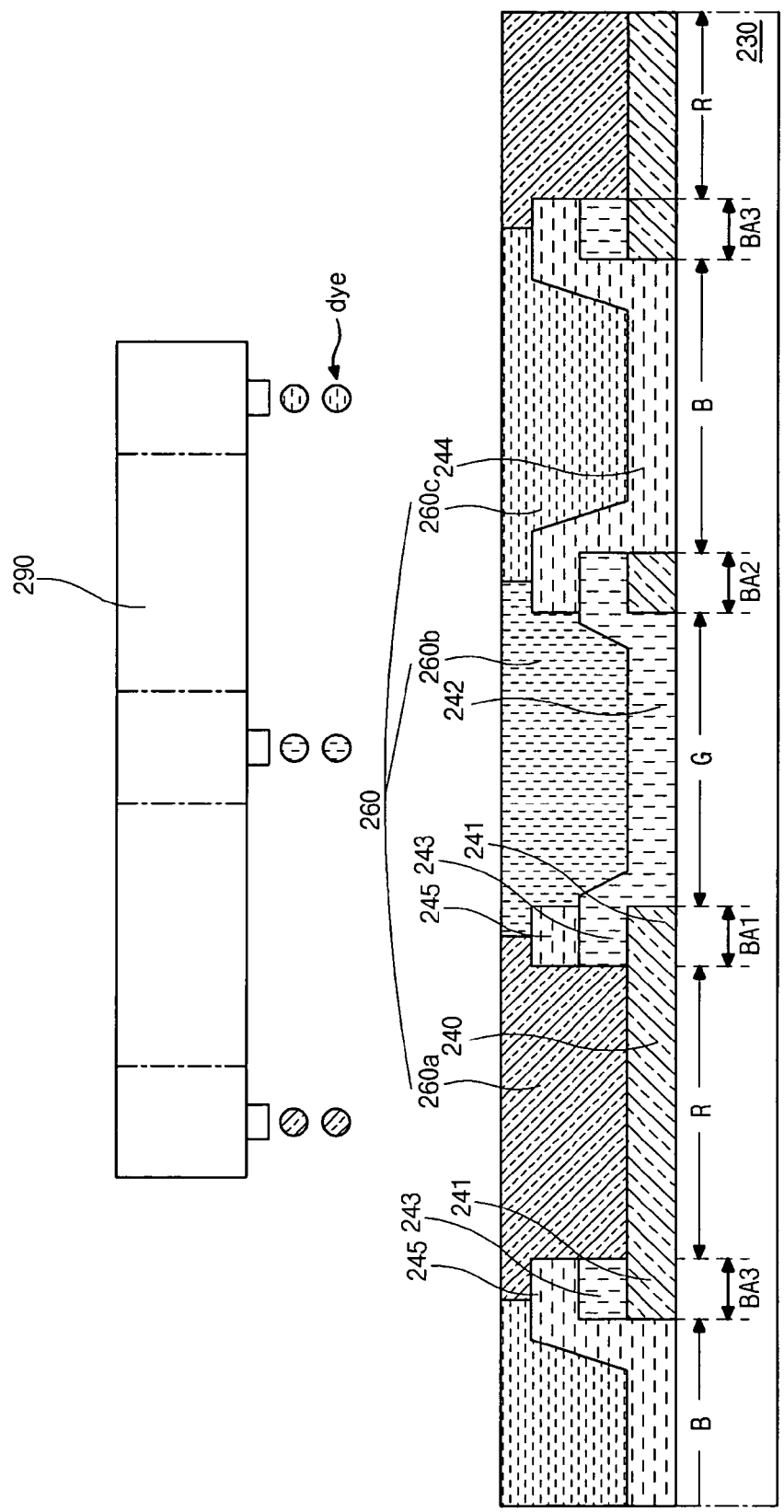
Figure 3C:
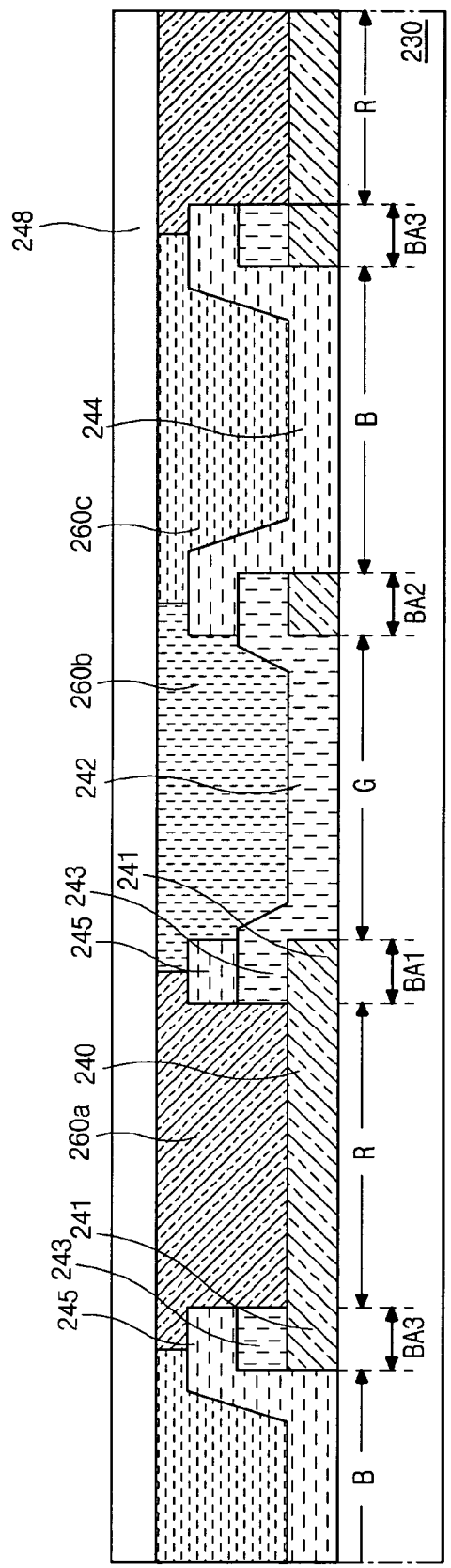

FIGS. 3A to 3C are cross-sectional views illustrating a further method of fabricating a color filter substrate according to the present invention. In FIG. 3A, the first red, first green and first blue color filter patterns 240, 242 and 244 are formed in the first, second and third sub-pixel regions R, G and B of a substrate 230, and the second red, second green and second blue color filter patterns 241, 243 and 245 are sequentially formed in each of the first, second and third border regions BA1, BA2 and BA3.

The first red, first green and first blue color filter patterns 240, 242 and 244 and the second red, second green and second blue color filter patterns 241, 243 and 245 may be formed according to the same processes described above. Therefore, the first red, first green and first blue color filter patterns 240, 242 and 244 may have the same thickness as in the above example (i.e., about 1 µm to about 2 µm).

However, in a preferred embodiment, the first red, first green and first blue color filter patterns 240, 242 and 244 have a thickness less than 1 µm in the sub-pixel regions and a combined thickness of less than 3 µm in the border regions comprising the second red, second green and blue color filter patterns 241, 243 and 245 (FIG. 3A). As depicted in FIG. 3A, a colorless, transparent dye-absorbing layer 259 may be formed on substantially an entire surface of the substrate 230 including the first red, first green and first blue color filter patterns 240, 242 and 244 and the second red, second green and second blue color filter patterns 241, 243 and 245. The dye-absorbing layer 259 may have a thickness greater than 2 µm, such that a top surface of the dye-absorbing layer 259 is equal to or higher than a top surface of the second blue color filter pattern 245 in the border regions BA1, BA2 and BA3. The dye-absorbing layer 259 may be formed by coating a colorless, transparent, dye-absorbing material. The dye-absorbing layer 259 may be formed of the same material used in the first red, green and blue color filter patterns 240, 242 and 244 absent the pigments. For example, the dye-absorbing layer 259 may be made of from acrylic or epoxy material.

Red, green and blue dyes, which are smaller and more uniform than pigments, may be absorbed into the transparent, dye-absorbing layer 259 of FIG. 3A. The dyes may be absorbed by spraying or ink-jetting the dyes through an inkjet apparatus 290. Accordingly, third red, third green and third blue color filter patterns 260a, 260b and 260c may be formed on the first red, first green and first blue color filter patterns 240, 242 and 244 in the respective sub-pixel regions R, G and B (FIG. 3B). Thus, color filter patterns having the same color are formed in each sub-pixel region. That is, the first red color filter pattern 240 and the third red color filter pattern 260a are formed in the first sub-pixel region R, the first green color filter pattern 242 and the third green color filter pattern 260b are formed in the second sub-pixel region G and the first blue color filter pattern 244 and the third blue color filter pattern 260c are formed in the third sub-pixel region B.

In a further aspect, dyes may also be absorbed into the dye-absorbing layer 259 of FIG. 3A at the border regions BA1, BA2 and BA3. Although not shown, the dyes may not be absorbed into the dye-absorbing layer at the border regions BA1, BA2 and BA3 in another embodiment. In particular, a dye sprayed or ink-jetted into a first, second or third sub-pixel region may also be sprayed or ink-jetted into the border regions adjacent to the sub-pixel region in which the dye is applied. Accordingly, each of the third red, third green and third blue color filter patterns may at least partially cover a second red, second green or second blue color filter pattern in each of the adjacent border regions.

Although the first and second red, first and second green and first and second blue color filter patterns are sequentially formed in FIG. 3A (as in FIGS. 2B-2H), other forming orders may be employed and other color filter patterns may be formed, as long as color filter patterns having the same color are formed in each sub-pixel region.

A common electrode 248 may be formed on substantially an entire surface of the third red, green and blue color filter patterns 260a, 260b and 260c by depositing a transparent conductive material (FIG. 3C). The transparent conductive material may be indium tin oxide or indium zinc oxide.

The third red, third green and third blue color filter patterns 260a, 260b and 260c effectively increase the thickness of the color filter layer having the first red, third green and third blue color filter patterns 240, 242 and 244, thereby increasing color purity and improving color reproducibility. The third red, third green and third blue color filter patterns 260a, 260b and 260c further function as a planarization layer.

In general, since dyes are smaller and more uniform than pigments, when comparing two color filter layers identical in thickness, a color filter layer containing dyes exhibits increased color purity compared to a color filter layer containing pigments. However, dyes confer less thermal resistance than pigments. Accordingly, pigments are preferably used for color filter substrates in liquid crystal display devices fabricated by high temperature processes.

The color filter substrate exemplified in FIGS. 3A-3B has upper color filter patterns including dyes and a lower color filter patterns including pigments. The lower color filter patterns include pigments compensating for reduced thermal resistance by the upper color filter patterns, whereas the upper color filter patterns include dyes compensating for reduced color reproducibility in the lower color filter patterns. Accordingly, a color filter substrate having lower color filter patterns including pigments and upper color filter patterns including dyes may provide a color filter substrate with improved color properties.

In the present invention, red, green and blue color filter patterns may be formed in the border regions so that function as a black matrix. Accordingly, the present invention precludes the need for a photolithographic apparatus, thereby simplifying the manufacturing process and reducing manufacturing costs. Moreover, use of dyes in a dye-absorbing layer to produce color filter patterns containing dyes over color filter patterns containing pigments may improve color reproducibility. The color filter patterns including dyes can act as a planarization layer and can enable the use of color filter transcription film containing pigments to form color filter patterns having a thickness less than about 1 μm. This may increase accuracy in forming fine color patterns and may increase productivity accordingly.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the specification and the appended claims and their equivalents.

What is claimed is:

1. A color filter substrate for a liquid crystal display device, comprising:
   a substrate including first, second and third sub-pixel regions and first, second and third border regions between adjacent sub-pixel regions;
   first red, first green and first blue color filter patterns at the first, second and third sub-pixel regions, respectively;
   second red, second green and second blue color filter patterns at each of the first, second and third border regions; and
   third red, third green and third blue color filter patterns on the first red, green and blue color filter patterns, respectively, wherein each of the third red, third green and third blue color filter patterns at least partially covers a second red, second green or second blue color filter pattern in each of the adjacent border regions, and wherein each the third red, third green and third blue color filter patterns include dyes.

2. The color filter substrate according to claim 1, wherein the border regions function as a black matrix blocking light.

3. The color filter substrate according to claim 1, further comprising an overcoat layer covering the first red, green and blue color filter patterns and the second red, second green and second blue color filter patterns.

4. The color filter substrate according to claim 3, further comprising a common electrode on the overcoat layer.

5. The color filter substrate according to claim 3, wherein the overcoat layer has a thickness between about 3 μm and about 6 μm.

6. The color filter substrate according to claim 1, wherein each of the first red, first green and first blue color filter patterns has a thickness between about 1 μm and about 2 μm.

7. The color filter substrate according to claim 6, wherein the combined thickness of the second red, second green and second blue color filter patterns in a border regions is between about 3 μm and about 6 μm.

8. The color filter substrate according to claim 1, further comprising third red, third green and third blue color filter patterns on the first red, green and blue color filter patterns, respectively, wherein the third red, third green and third blue color filter patterns include dyes.

9. The color filter substrate according to claim 8, further comprising a common electrode on the third red, third green and third blue color filter patterns.

10. The color filter substrate according to claim 8, wherein each of the first red, first green and first blue color filter patterns has a thickness less than about 1 μm.

11. The color filter substrate according to claim 10, wherein the combined thickness of second red, second green and second blue color filter patterns in a border region is less than about 3 μm.

12. The color filter substrate according to claim 10, wherein each of the third red, third green and third blue color filter patterns has a thickness less than about 3 μm.

13. The color filter substrate according to claim 8, wherein the first red, first green and first blue color filter patterns include pigments.

14. The color filter substrate according to claim 1, further comprising a common electrode on the third red, third green and third blue color filter patterns.

15. The color filter substrate according to claim 1, wherein each of the first red, first green and first blue color filter patterns has a thickness less than about 1 μm.

16. The color filter substrate according to claim 15, wherein the combined thickness of second red, second green and second blue color filter patterns in a border region is less than about 3 μm.

17. The color filter substrate according to claim 15, wherein each of the third red, third green and third blue color filter patterns has a thickness less than about 3 μm.

18. The color filter substrate according to claim 1, wherein the first red, first green and first blue color filter patterns include pigments.

19. A method of fabricating a color filter substrate for a liquid crystal display device, comprising:

provided a substrate including first, second and third sub-pixel regions and first, second and third border regions between adjacent sub-pixel regions;

forming a first red color filter pattern at the first sub-pixel region and a second red color filter pattern at each of the first, second and third border regions;

forming a first green color filter pattern at the second sub-pixel region and a second green color filter pattern at each of the first, second and third border regions;

forming a first blue color filter pattern at the third sub-pixel region and a second blue color filter pattern at each of the first, second and third border regions; and forming third red, third green and third blue color filter patterns on the first red, green and blue color filter patterns, respectively, wherein each of the third red, third green and third blue color filter patterns at least partially covers one of a second red, second green or second blue color filter pattern in each of the adjacent border regions, and wherein the third red, third green and third blue color filter patterns include dyes.

20. The method according to claim 19, wherein the first red color filter pattern is formed on the substrate before the first green and the first blue color filter patterns.

21. The method according to claim 19, wherein a thermal imaging method is used to form each of the first red, first green and first blue color filter patterns and each of the second red, second green and second blue color filter patterns.

22. The method according to claim 21, wherein the thermal imaging method comprises:

adhering a color filter transcription film to the substrate such that a color filter layer faces the substrate;

selectively transferring the color filter layer on the substrate by irradiating a laser beam on the color filter transcription film; and removing the color filter transcription film after irradiating the laser beam.

23. The method according to claim 19, further comprising forming an overcoat layer covering the first red, first green and first blue color filter patterns and the second red, second green and second blue color filter patterns.

24. The method according to claim 23, further comprising forming a common electrode on the overcoat layer.

25. The method according to claim 19, further comprising hardening the first and second red color filter patterns after forming the first and second red color filter patterns, hardening the first and second green color filter patterns after forming the first and second green color filter patterns, and hardening the first and second blue color filter patterns after forming the first and second blue color filter patterns.

26. The method according to claim 25, further comprising an additional hardening step after each of the first and second red, first and second green and first and second blue color filter patterns have been hardened.

27. The method according to claim 19, further comprising forming third red, third green and third blue color filter patterns on the first red, first green and first blue color filter patterns, respectively, wherein the third red, third green and third blue color filter patterns include dyes.

28. The method according to claim 27, wherein forming the third red, green and blue color filter patterns comprises:

forming a dye-absorbing layer over the first red, first green and first blue color filter patterns and over the second red, second green and second blue color filter patterns; and spraying or ink-jetting red, green and blue dyes into the dye-absorbing layer at the first, second and third sub-pixel regions, respectively.

29. The method according to claim 28, wherein the dye that is sprayed or ink-jetted into a first, second or third sub-pixel region is also sprayed or ink-jetted into the border regions adjacent to the first, second or third sub-pixel region.

30. The method according to claim 27, further comprising forming a common electrode over the third red, third green and third blue color filter patterns.

* * * * *